United States Patent Office 3,745,187
Patented July 10, 1973

3,745,187
BIS-THIOUREIDO-BENZENES AND
PREPARATION THEREOF
Teruhisa Noguchi, Keisuke Kohmoto, Yasushi Yasuda, and Sho Hashimoto, Kanagawa, Kinpei Kato, Tokyo, and Koshin Miyazaki and Daigaku Takiguchi, Toyama, Japan, assignors to Nippon Soda Company, Ltd., Tokyo, Japan
No Drawing. Original application Oct. 28, 1968, Ser. No. 771,269. Divided and this application Oct. 21, 1971, Ser. No. 191,496
Claims priority, application Japan, Oct. 30, 1967, 42/69,358; Dec. 27, 1967, 43/83,295; Apr. 13, 1968, 43/24,528; Apr. 19, 1968, 43/25,829; June 18, 1968, 43/41,587, 43/41,589
Int. Cl. C07c 125/00, 155/02
U.S. Cl. 260—455 A
1 Claim

ABSTRACT OF THE DISCLOSURE

The compounds having either formula

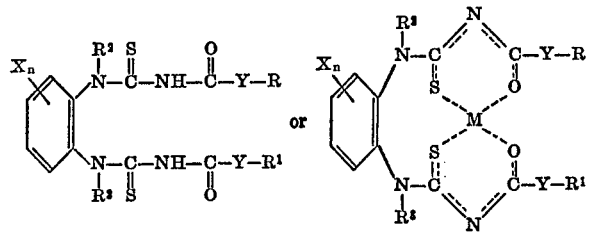

(wherein each of R and $R^1$ represents alkyl of 1 to 12 carbon atoms, alkyl of 1 to 2 carbon atoms substituted with halogen, methoxy or phenyl, alkenyl having 2 to 3 carbon atoms, alkynyl having 2 to 3 carbon atoms, aryl or aryl substituted with halogen, nitro or methyl; each of $R^2$ and $R^3$ represents hydrogen or methyl; X represents halogen, nitro or methyl; n represents integer of 0–3; Y represents oxygen or sulfur and M represents metal) are prepared in accordance with the following equations:

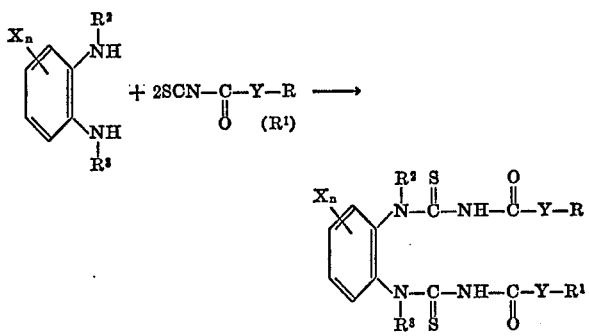

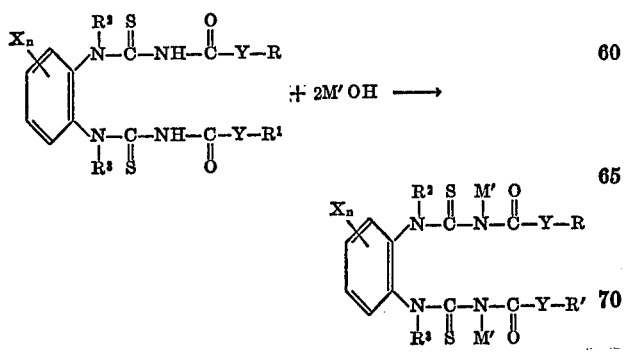

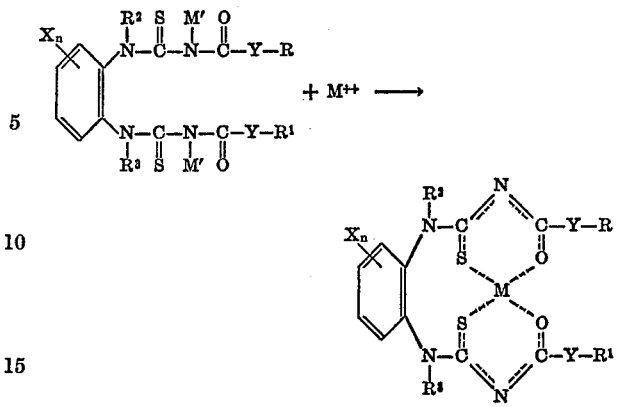

wherein M' represents alkali metal atom and the novel compounds have broad fungicidal activity with very low mammalian toxicity.

This application is a division of United States patent application Ser. No. 771,269, filed Oct. 28, 1968.

This invention relates to novel bis-thioureidobenzenes having superior fungicidal activity and to a process for the preparation of the same. Further, the invention relates to fungicidal compositions containing one or more of said novel compounds and further includes methods for combatting fungi with the same compounds.

The novel compounds in the present invention are characterized by one of the following formulas:

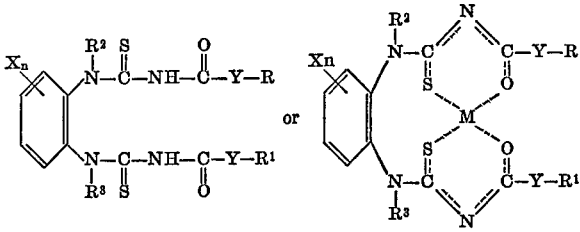

(wherein each of R and $R^1$ represents a monovalent radical selected from the group consisting of alkyl of 1 to 12 carbon atoms; alkyl of 1 to 2 carbon atoms substituted with halogen, methoxy or phenyl; alkenyl having 2 to 3 carbon atoms; alkynyl having 2 to 3 carbon atoms; aryl or aryl substituted with halogen, nitro or methyl; each of $R^2$ and $R^3$ represents hydrogen or methyl; X represents halogen, nitro or methyl; n represents an integer from 0 to 3; Y represents oxygen or sulfur and M represents a metal atom.) The compounds have superior fungicidal activity against various plant diseases such as rice blast disease, cucumber anthracnose, Cercospora leaf spot of sugar beets and rice sheath blight disease. It is an advantage of the invention that said compounds have very low mammalian toxicity.

The compounds of this invention can be prepared by the reactions illustrated below, wherein R, $R^1$, $R^2$, $R^3$, X, Y and n are defined as above:

(1)

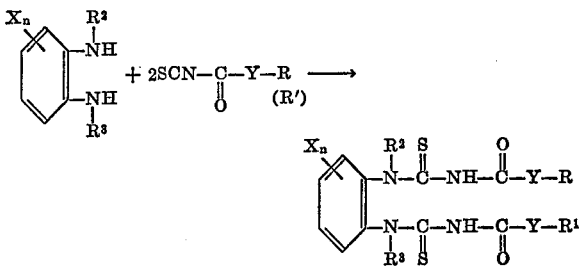

The reaction Equation 1 is carried out in an inert organic solvent such as acetone, methylethylketone, methanol, ethanol, dioxane, acetonitrile, benzene or toluene, at a temperature of 0–150° C., preferably 10–60° C., ordinarily in about ten minutes to one hour, but occasionally in several hours. After the reaction ends, the compound is isolated from the reaction mixture by conventional techniques. For example, the reaction mixture may be cooled or added to water. The precipitated material is separated from the solution by filtration. Instead, solvent may be distilled off from the reaction mixture. If necessary, the prepared compound may be further purified by washing with water and by recrystallizing from a solvent such as acetone, methanol, ethanol and dioxane.

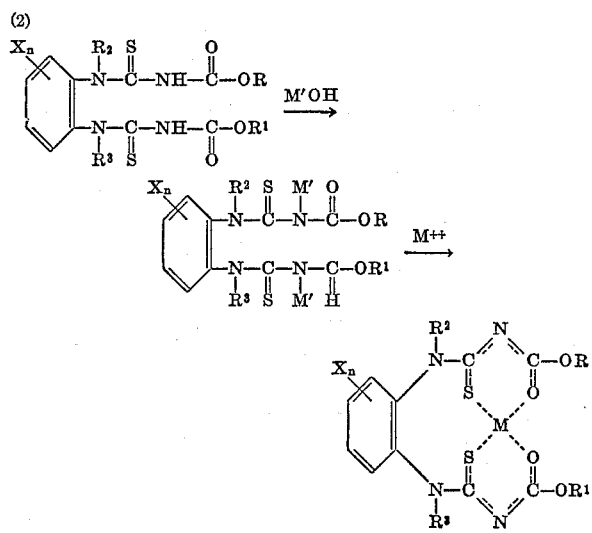

The reaction Equation 2 is carried out smoothly in aqueous solution at normal room temperature. After the reaction, precipitated material is separated from the solution by conventional procedures, such as filtration. The desired product may be obtained by washing the precipitate with water and hot acetone. The reaction Equation 2 is preferably carried out when the sulfate or the chloride of Cu, Ca or Ba is used to supply $M^{++}$.

In order to facilitate a clear understanding of the invention, the following preferred specific embodiments are described as illustrative and not as limiting the invention.

EXAMPLE 1

1,2-bis-(3-ethoxycarbonyl-2-thioureido)-benzene (Compound 2)

59.0 g. (0.54 mol.) of ethyl chloroformate were added to 54.4 g. (0.56 mol.) of potassium thiocyanate in 300 ml. of acetone at room temperature under agitation, and the mixture was heated and kept at a room temperature of 35–45° C. on a water bath for one hour. Then the mixture containing the resulting ethoxycarbonylisothiocyanate was cooled and kept at a temperature of 10–20° C. on an ice water bath under agitation. 15.5 g. (0.143 mol.) of o-phenylenediamine were dropped into the mixture, while it was maintained at a temperature of 10–20° C. on an ice water bath under agitation. Then the reaction mixture was kept at room temperature for one hour, and allowed to stand to precipitate a large quantity of crystals. The reaction mixture was filtered, and the recovered crystals were washed with water and dried.

47 g. of crystals were obtained. The crystals were light yellow, and had a decomposition point of 190–191° C. Colorless plates having the decomposition point of 194° C. were obtained by recrystallization from acetone.

EXAMPLE 2

4-nitro-1,2-bis-(3-ethoxycarbonyl-2-thioureido)-benzene (Compound 7)

19.0 g. (0.175 mol.) of ethyl chloroformate were added to 18.0 g. (0.185 mol.) of potassium thiocyanate in 150 ml. of acetonitrile at room temperature under agitation, and the mixture was heated and kept at a temperature of 35–45° C. on a water bath. 12.3 g. (0.08 mol.) of 4-nitro-o-phenylenediamine were dropped into the mixture containing the resulting ethoxycarbonylisothiocyanate, while it was maintained at a temperature of 20–30° C. The reaction mixture was heated on a steam bath for one hour under reflux. Then the reaction mixture was cooled and about 500 ml. of cold water was added thereto.

33.0 g. of crystals were obtained following the procedure of Example 1. Light yellow needles having the decomposition point of 205–206° C. were obtained by recrystallization from acetone.

EXAMPLE 3

1,2-bis-(3-(2-methoxy)-ethoxycarbonyl-2-thioureido)-benzene (Compound 11)

13.8 g. (0.1 mol.) of 2-methoxyethylchloroformate were added to 10.8 g. (0.11 mol.) of potassium thiocyanate in 80 ml. of acetone at room temperature under agitation, and the mixture was heated and kept at a temperature of 40–45° C. for one hour on a water bath. 4.0 g. (0.037 mol.) of o-phenylenediamine were dropped into the mixture containing the 2-(methoxy)-ethoxycarbonylisothiocyanate produced from said reactants while the mixture was maintained at a temperature of 10–20° C. on an ice water bath. The reaction mixture was heated on a steam bath for one hour under reflux. Then the reaction mixture was cooled to room temperature and about 300 ml. of water was added to the cooled mixture.

14.0 g. of the crystals which formed were recrystallized from acetone to obtain colorless needles having M.P. 170–171° C.

EXAMPLE 4

1,2-bis-(3-ethylthiocarbonyl-2-thioureido)-benzene (Compound 13)

8.7 g. (0.07 mol.) of S-ethyl chlorothiol formate were added to 7.8 g. (0.08 mol.) of potassium thiocyanate in 60 ml. of dioxane at room temperature under agitation, and mixture was heated and kept at a temperature of 35–40° C. for 30 minutes. 3.3 g. (0.03 mol.) of o-phenylenediamine were dropped into the mixture while it was kept at a temperature of 10–20° C. The resulting reaction mixture was kept at room temperature for one hour under agitation. Then dioxane was distilled off from the mixture and about 200 ml. of water were added to the residue.

8 g. of the resulting light yellow crystals were recrystallized from dioxane to obtain colorless prisms having decomposition point of 191–192° C.

EXAMPLE 5

Copper salt of 1,2-bis-(3-ethoxycarbonyl-2-thioureido)-benzene (Compound 28)

59 g. (0.16 mol.) of 1,2-bis(3-ethoxycarbonyl-2-thiouredio)-benzene were added to 13 g. (0.32 mol.) of caustic soda in 700 ml. of water at about 20° C. under agitation. The mixture was agitated for 15 minutes and then filtered. 40 g. (0.16 mol.) of crystallized cupric sulfate ($CuSO_4 \cdot 5H_2O$) in 300 ml. of water were dropped into the above mixture under agitation. The reaction mixture was agitated at room temperature for one hour, and filtered. The recovered material was washed with water and dried at 50° C.

67.5 g. of powder were obtained. The powder was dark green, and had a decomposition point of 138–139° C. 44.5 g. of the dark green powder having the decomposition point of 141–142° C. were obtained by washing the first powder three times with 200 ml. of hot acetone.

EXAMPLE 6

Calcium salt of 1,2-bis-(3-ethoxycarbonyl-2-thioureido)-benzene (Compound 26)

67.5 g. of powder were obtained according to a procedure similar to that of Example 5, except for 26.5 g. (0.18 mol.) of crystallized calcium chloride $$(CaCl_2 \cdot 2H_2O)$$

in 200 ml. of water instead of 40 g. (0.16 mol.) of crystallized cupric sulfate in 300 ml. of water. The powder was colorless and had a decomposition point of 178–180° C. (d). 60 g. of a colorless powder having a decomposition point of 169–171°C. were obtained by washing the first powder three times with 200 ml. of hot acetone.

Some typical compounds of the present invention are listed in Table 1, along with some of their properties.

These typical compounds in Table 1 include merely some of the compounds of the present invention, so that the scope of the present invention is not intended to be limited only to those compounds listed in Table 1.

TABLE 1

| No. of compound | Structural formula | Appearance | Melting point or decomposition point (d) (° C.) | Molecular formula | Analysis (percent) for— C | H | N |
|---|---|---|---|---|---|---|---|
| 1 | 1,2-bis-(3-methoxycarbonyl-2-thioureido)-benzene | Colorless prisms. | 181.5–182.5 (d) | $C_{12}H_{14}N_4O_4S_2$ | 42.35 (42.10) | 4.46 (4.09) | 16.70 (16.35) |
| 2 | 1,2-bis-(3-ethoxycarbonyl-2-thioureido)-benzene | Colorless plates. | 195 (d) | $C_{14}H_{18}N_4O_4S_2$ | 45.35 (45.41) | 5.08 (4.85) | 14.90 (15.19) |
| 3 | 1,2-bis-(3-isopropoxycarbonyl-2-thioureido)-benzene | Colorless powder. | 205–206 (d) | $C_{16}H_{22}N_4O_4S_2$ | 48.40 (48.24) | 5.72 (5.53) | 13.87 (14.07) |
| 4 | 1,2-bis-(3-isobutoxycarbonyl-2-thioureido)-benzene | Pale yellow tablets. | 197–198 (d) | $C_{18}H_{26}N_4O_4S_2$ | 50.70 (50.70) | 6.35 (6.10) | 13.87 (13.15) |
| 5 | 4-methyl-1,2-bis-(3-ethoxycarbonyl-2-thioureido)-benzene | Pale yellow powder. | 175–176 (d) | $C_{15}H_{20}N_4O_4S_2$ | 46.70 (46.88) | 5.32 (5.22) | 14.30 (14.58) |
| 6 | 4-chloro-1,2-bis-(3-ethoxycarbonyl-2-thioureido)-benzene | ...do... | 170.5–171.5 (d) | $C_{14}H_{17}ClN_4O_4S_2$ | 41.70 (41.53) | 4.57 (4.20) | 13.75 (13.84) |
| 7 | 4-nitro-1,2-bis-(3-ethoxycarbonyl-2-thioureido)-benzene | Light yellow plates. | 205–205.5 (d) | $C_{14}H_{17}N_5O_6S_2$ | 40.20 (40.48) | 4.16 (4.10) | 16.71 (16.87) |
| 8 | 4,5-dichloro-1,2-bis-(3-ethoxycarbonyl-2-thioureido)-benzene | Light brown scales. | 206–207 (d) | $C_{14}H_{16}Cl_2N_4O_4S_2$ | 38.31 (38.27) | 3.71 (3.67) | 12.68 (12.75) |
| 9 | 3,4,6-trichloro-1,2-bis-(3-ethoxycarbonyl-2-thioureido)-benzene | Pale brown powder. | 180–181 | $C_{14}H_{15}Cl_3N_4O_4S_2$ | 35.53 (35.49) | 3.11 (3.19) | 11.91 (11.83) |

TABLE 1—Continued

| No. of compound | Structural formula | Appearance | Melting point or decomposition point (d) (° C.) | Molecular formula | Analysis (percent) for— | | |
|---|---|---|---|---|---|---|---|
| | | | | | C | H | N |
| 10 | (structure: benzene with two NH–C(S)–NH–C(O)–O–CH₂–C₆H₅ groups) | Colorless prisms. | 171–172 | C₂₈H₂₂N₄O₄S₂ | 58.45 (58.30) | 4.50 (4.45) | 11.40 (11.33) |
| 11 | (structure: benzene with two NH–C(S)–NH–C(O)–O–CH₂CH₂OCH₃ groups) | Colorless needles. | 170.5–171.5 | C₁₆H₂₂N₄O₆S₂ | 44.58 (44.70) | 5.23 (5.12) | 12.90 (13.02) |
| 12 | (structure: benzene with two NH–C(S)–NH–C(O)–O–C₂H₄Cl groups) | Colorless plates. | 181–182 (d) | C₁₄H₁₆Cl₂N₄O₄S₂ | 38.40 (38.25) | 3.45 (3.64) | 12.63 (12.75) |
| 13 | (structure: benzene with two NH–C(S)–NH–C(O)–S–C₂H₅ groups) | Colorless prisms. | 191–192 (d) | C₁₄H₁₈N₄O₂S₄ | 41.68 (41.80) | 4.38 (4.48) | 13.80 (13.94) |
| 14 | (structure: benzene with two NH–C(S)–NH–C(O)–S–n-C₁₂H₂₅ groups) | Colorless needles. | 122–123.5 (d) | C₃₄H₅₈N₄O₂S₄ | 59.50 (59.82) | 8.43 (8.50) | 8.02 (8.21) |
| 15 | (structure: benzene with two NH–C(S)–NH–C(O)–O–CH₂CH=CH₂ groups) | Colorless leaflets. | 166–167 | C₁₆H₁₈N₄O₄S₂ | 48.82 (48.77) | 4.59 (4.61) | 14.29 (14.22) |
| 16 | (structure: benzene with two NH–C(S)–NH–C(O)–O–CH₂–C≡CH groups) | Light brown plates. | 172–173 (d) | C₁₆H₁₄N₄O₄S₂ | 49.36 (49.27) | 3.58 (3.62) | 14.42 (14.37) |
| 17 | (structure: benzene with two NH–C(S)–NH–C(O)–O–C₆H₄–Cl groups) | White powder. | 193 (d) | C₂₂H₁₆Cl₂N₄O₄S₂ | 49.42 (49.35) | 2.99 (3.01) | 10.51 (10.46) |
| 18 | (structure: benzene with two NH–C(S)–NH–C(O)–O–C₆H₄–NO₂ groups) | Yellow powder. | 186 (d) | C₂₂H₁₆N₆O₈S₂ | 47.61 (47.48) | 3.02 (2.90) | 15.28 (15.10) |
| 19 | (structure: chloro-benzene with two NH–C(S)–NH–C(O)–O–C₆H₄–CH₃ groups) | Colorless crystals. | 191–192 (d) | C₂₄H₂₁ClN₄O₄S₂ | 54.51 (54.48) | 3.92 (4.00) | 10.60 (10.59) |

TABLE 1—Continued

| No. of compound | Structural formula | Appearance | Melting point or decomposition point (d) (° C.) | Molecular formula | Analysis (percent) for— C | H | N |
|---|---|---|---|---|---|---|---|
| 20 | (structure) | ...do... | 199–200 (d) | $C_{23}H_{18}Cl_2N_4O_4S_2$ | 50.41 (50.27) | 3.19 (3.30) | 10.35 (10.20) |
| 21 | (structure) | Yellow powder. | 191–192 (d) | $C_{30}H_{23}N_4O_4S_2$ | 63.60 (63.59) | 4.05 (3.91) | 10.06 (9.89) |
| 22 | (structure) | ...do... | 180 (d) | $C_{30}H_{21}N_5O_6S_2$ | 59.03 (58.91) | 3.51 (3.46) | 11.39 (11.45) |
| 23 | (structure) | Pale yellow plates. | 176–177 (d) | $C_{15}H_{20}N_4O_4S_2$ | 46.91 (46.87) | 5.19 (5.25) | 14.53 (14.58) |
| 24 | (structure) | Oil | | $C_{16}H_{22}N_4O_4S_2$ | 48.02 (48.24) | 5.39 (5.57) | 14.09 (14.06) |
| 25 | (structure) | Colorless plates. | 177–178 (d) | $C_{13}H_{16}N_4O_4S_2$ | 43.65 (43.81) | 4.61 (4.52) | 15.58 (15.72) |
| 26 | (structure) | Colorless powder. | 178–180 (d) | $C_{14}H_{16}CaN_4O_4S_2$ | 41.25 (41.21) | 4.05 (3.95) | 13.67 (13.73) |
| 27 | (structure) | Light yellow powder. | >310 | $C_{14}H_{16}BaN_4O_4S_2$ | 33.35 (33.27) | 3.02 (3.19) | 11.21 (11.09) |

TABLE 1—Continued

| No. of compound | Structural formula | Appearance | Melting point or decomposition point (d) (°C.) | Molecular formula | Analysis (percent) for— C | H | N |
|---|---|---|---|---|---|---|---|
| 28 | | Dark green powder. | 138-139 (d) | C₁₄H₁₆CuN₄O₄S₂ | 39.02 (38.97) | 3.64 (3.74) | 13.04 (12.99) |
| 29 | | ……do…… | 158 (d) | C₁₅H₁₈CuN₄O₄S₂ | 40.52 (40.39) | 3.99 (4.07) | 12.73 (12.56) |
| 30 | | ……do…… | 300 (d) | C₁₄H₁₅CuN₅O₆S₂ | 35.29 (35.25) | 3.08 (3.17) | 14.72 (14.68) |
| 31 | | ……do…… | 175 (d) | C₁₄H₁₅ClCuN₄O₄S₂ | 36.12 (36.05) | 3.31 (3.24) | 12.16 (12.01) |
| 32 | | Light yellow powder. | 175 (d) | C₁₄H₁₅CaN₅O₆S₂ | 37.23 (37.08) | 3.21 (3.33) | 15.57 (15.44) |
| 33 | | Colorless powder. | 161-162 (d) | C₁₂H₁₂CaN₄O₄S₂ | 38.34 (38.18) | 3.31 (3.20) | 14.89 (14.84) |
| 34 | | Green powder | 144 (d) | C₁₂H₁₂CuN₄O₄S₂ | 36.10 (35.95) | 2.94 (3.02) | 14.02 (13.98) |

TABLE 1—Continued

| No. of compound | Structural formula | Appearance | Melting point or decomposition point (d) (°C) | Molecular formula | Analysis (percent) for— C | H | N |
|---|---|---|---|---|---|---|---|
| 35 | (structure with Ba, two NH–C(=S)–C(=O)OCH$_3$ groups) | Light green powder. | 181 (d) | C$_{18}$H$_{18}$BaN$_4$O$_4$S$_2$ | 30.52 (30.36) | 2.47 (2.55) | 11.95 (11.80) |
| 36 | (structure with Ca, two NH–C(=S)–C(=O)OCH$_2$CH=CH$_2$ groups) | Colorless powder. | 150 (d) | C$_{18}$H$_{18}$CaN$_4$O$_4$S$_2$ | 44.78 (44.74) | 3.85 (3.75) | 13.21 (13.04) |

The compounds listed in Table 1 possess very superior fungicidal activity compared to known compounds.

In this invention usually a small but effective amount of the compounds is applied to plant surface by spraying, drenching or dusting to protect or control the microbes and diseases. The concentrations of the active ingredients in the fungicidal compositions of this invention vary according to type of formulation, and they are, for example, used in a range of 10–80 weight percent, preferably 20–60 weight percent, in wettable powder, 10–70 weight percent, preferably 10–50 weight percent, in emulsifiable concentrates, and 0.5–10 weight percent, preferably 1–5 weight percent in dust formulations. In the above formulation of the composition, auxiliary agents or materials, for example, inert mineral powders such as clay, talc and diatomaceous earth, dispersing agents such as sodium lignin sulfonate and casein, and wetting agents such as alkylarylsulfonate and polyoxyethylene alkylphenol, may be employed according to the type of the formulation for combating fungi and bacteria. Furthermore, the composition may be applied as a mixture with other fungicides, insecticides, acaricides, plant growth regulators and fertilizers.

The non-limiting examples for the fungicidal compositions are illustrated as follows:

EXAMPLE 7

Wettable powder

| | Parts by weight |
|---|---|
| Compound 2 | 30 |
| Sodium alkylsulfonate | 5 |
| Diatomaceous earth | 65 |

These were mixed and micronized in jet pulverizer to a particle size of 10–20 microns. In practical use, the micronized mixture is diluted to a concentration of 0.01 to 0.05% of active ingredient with water. The suspension is applied as spray or drench.

EXAMPLE 8

Emulsifiable concentrate

| | Parts by weight |
|---|---|
| Compound 23 | 10 |
| Xylene | 45 |
| Cyclohexanone | 39 |
| Phenyl polyoxyethylene | 6 |

These were mixed and dissolved. In practical use, the solution is diluted with water to a concentration of 0.01 to 0.05% of active ingredient and this suspension is sprayed or used for drenching.

EXAMPLE 9

Dust formulation

| | Parts by weight |
|---|---|
| Compound 5 | 2 |
| Talc | 98 |

These were mixed and crushed to fine powder. The dust formulation is usually applied as dusting powder at a rate of 3 to 5 kg. per 10 are.

In the Examples 7–9, it is not intended to limit the emulsifying, wetting or dispersing agents, carriers and solvents to the ones described by way of illustration.

With regard to mammalian toxicity of the typical compound, for example, that of Compound 2 in Table 1 is 15,000 mg./kg. and that of Compound 1 is up to 3,000 mg./kg. as the value of acute order LD–50 for mice.

The superior fungicidal effects of the novel compounds of this invention are clearly illustrated by the following tests.

TEST 1

Test for control of rice blast disease

The compound to be tested was applied as water-diluted solution of wettable powder prepared according to the method of Example 7. The potted rice plants grown to a 3-leaf stage were sprayed at a rate of 25 cc./pot with solutions of the test materials. One day later, the plants were inoculated with a spore suspension of rice blast fungus, *Piricularia oryzae,* and held under the condition of incubation (at about 100% relative humidity and 26° C.) in a wet cabinet for 24 hours. Then the plants were moved to a greenhouse bench. Ten days after incubation, number of lesions per pot were examined and evaluation of percent disease control was based upon the percentage of lesions occurring on the untreated check. The results are shown in Table 2.

TABLE 2

| Compound number: | Conc. of active ingredient, γ/ml. | Average number of lesions per pot | Control value, percent | Phytotoxicity |
|---|---|---|---|---|
| 2 | 500 | 2.5 | 97.5 | None. |
| 5 | 300 | 1.0 | 99 | Do. |
| 8 | 500 | 3.5 | 96.5 | Do. |
| 9 | 500 | 0.0 | 100 | Do. |
| 11 | 500 | 12.5 | 87.4 | Do. |
| 12 | 500 | 3.0 | 97 | Do. |
| 13 | 500 | 16.0 | 83.8 | Do. |
| 14 | 500 | 1.0 | 99 | Do. |
| 15 | 500 | 4.0 | 96 | Do. |
| 16 | 500 | 0.5 | 99.5 | Do. |
| 26 | 500 | 0 | 100 | Do. |
| 27 | 500 | 0 | 100 | Do. |
| 28 | 500 | 0 | 100 | Do. |
| 32 | 500 | 2.2 | 97.8 | Do. |
| 33 | 500 | 0 | 100 | Do. |
| 34 | 500 | 0 | 100 | Do. |
| 35 | 500 | 0 | 100 | Do. |
| 36 | 500 | 4.0 | 96.0 | Do. |
| Pentachloro benzyl alcohol | 500 | 4.0 | 96.0 | Do. |
| Check | | 99.5 | 0 | |

TEST 2

Test for control of cucumber anthracnose

The potted cucumber plants grown to a 3-leaf stage were sprayed at a rate of 50 ml. per 3 plants with water-diluted solution of the wettable powder prepared by the method of Example 7. One day later, the plants were inoculated with a spore suspension of cucumber anthracnose fungus, *Colletotrichum lagenarium*, and held under the condition of incubation (at about 100% relative humidity and 26° C.) in a wet cabinet for 20 hours. Then the plants were moved to a greenhouse bench. Seven days after incubation, average number of lesions per leaf were counted and evaluation of percent disease control was based upon the percentage of lesions occurring on the untreated check. The results are shown in Table 3.

TABLE 3

| Compound number: | Conc. of active ingredient, γ/ml. | Average number of lesions per pot | Control value, percent | Phytotoxicity |
|---|---|---|---|---|
| 1 | 300 | 8.2 | 97.3 | None. |
| 2 | 300 | 0.0 | 100 | Do. |
| 3 | 300 | 10.5 | 96.7 | Do. |
| 26 | 300 | 0.0 | 100 | Do. |
| 27 | 300 | 0.0 | 100 | Do. |
| 28 | 300 | 0.0 | 100 | Do |

TEST 3

Field test for control of Cercospora leaf spot of sugar beets

This test was conducted in an attempt to determine the effect of inhibition in development of the Cercospora leaf spot on leaves of sugar beets by the foliage spraying. The field was arranged in a randomized-block design with 4 replicate plots of each treatment consisting of 25 m.² per plot. The diluted sprays were applied at the rate of 100 liters per 10 are as a single application after incipient infection was apparent in the leaves. One month after spraying, disease data were taken by counting the infected leaves on 50-60 sugar beets selected at random from each plot and leaf spot severity was rated on a scale ranging from 0 to 5 in which 0=no leaf spot and 5=most of the leaves dead from disease. The results are shown in Table 4.

TABLE 4

| Compositions | Dilution ratio with water for spray | Disease rating At the time of spraying | Disease rating One month after spraying |
|---|---|---|---|
| Wettable powder containing 25% of Compound 2 | 1-250 | 0.65 | 0.97 |
| TPTA[1] wettable powder (20% active) | 1-1,000 | 0.77 | 2.71 |
| Check | | 0.70 | 4.61 |

[1] TPTA=Triphenyltin acetate.

TEST 4

Test for control of rice sheath blight disease

The compounds to be tested were applied as water-diluted solution of wettable powder prepared by the method of Example 7. The potted rice plants (24-25 plants per single pot) grown to a 5-leaf stage were sprayed at a rate of 25 cc./pot with solution of the test material. Two days later, the plants were inoculated with mycelia of the rice sheath blight fungus, *Corticium sasaki*, grown in a culture medium. The plants were transferred to a wet cabinet and held under the condition of incubation (at 100% relative humidity and 25-30° C.) for two days. At the end of this time, the plants were moved to a greenhouse bench. Eight days after incubation, number of plants infected were examined in each test pot and the data were recorded as infection rating made on a scale of 0=non infected; 1=up to 5 plants infected/pot; 2=6-15 plants infected/pot; 3=16 or more plants infected/pot. The results are shown in Table 5.

TABLE 5

| Compound number: | Conc. of active ingredient, γ/ml. | Infection rating | Phytotoxicity |
|---|---|---|---|
| 1 | 500 | 0.00 | None. |
| 2 | 500 | 0.00 | Do. |
| 3 | 500 | 0.00 | Do. |
| 4 | 500 | 0.50 | Do. |
| 5 | 500 | 0.30 | Do. |
| 6 | 500 | 0.30 | Do. |
| 10 | 500 | 0.50 | Do. |
| 19 | 500 | 1.00 | Do. |
| 23 | 500 | 0.80 | Do. |
| 24 | 500 | 0.50 | Do. |
| 26 | 500 | 0.50 | Do. |
| 27 | 500 | 0.25 | Do. |
| 28 | 500 | 0.25 | Do. |
| 29 | 500 | 0.30 | Do. |
| 30 | 500 | 0.50 | Do. |
| 31 | 500 | 0.50 | Do. |
| 32 | 500 | 0.10 | Do. |
| 33 | 500 | 0.30 | Do. |
| 34 | 500 | 0.10 | Do. |
| 35 | 500 | 0.30 | Do. |
| 36 | 500 | 0.50 | Do. |

We claim:
1. The compound having the formula

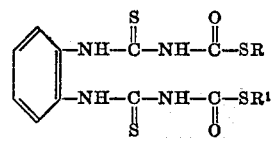

wherein each of R and R¹ is alkyl having 1 to 12 carbon atoms.

No references cited.

LEWIS GOTTS, Primary Examiner

D. R. PHILLIPS, Assistant Examiner

U.S. Cl. X.R.

260—438.1, 470; 424—300, 294